US011823576B2

(12) United States Patent
Ogata

(10) Patent No.: US 11,823,576 B2
(45) Date of Patent: Nov. 21, 2023

(54) VEHICLE MANAGEMENT DEVICE, VEHICLE MANAGEMENT METHOD, AND STORAGE MEDIUM HAVING PROGRAM STORED THEREIN

(71) Applicant: NEC Corporation, Tokyo (JP)

(72) Inventor: Kazuki Ogata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 185 days.

(21) Appl. No.: 17/427,733

(22) PCT Filed: Jan. 31, 2020

(86) PCT No.: PCT/JP2020/003613
§ 371 (c)(1),
(2) Date: Aug. 2, 2021

(87) PCT Pub. No.: WO2020/162343
PCT Pub. Date: Aug. 13, 2020

(65) Prior Publication Data
US 2022/0130257 A1 Apr. 28, 2022

(30) Foreign Application Priority Data

Feb. 4, 2019 (JP) ................................. 2019-018090

(51) Int. Cl.
G08G 1/00 (2006.01)
B60W 40/06 (2012.01)
G08G 1/01 (2006.01)

(52) U.S. Cl.
CPC ............. *G08G 1/22* (2013.01); *B60W 40/06* (2013.01); *G08G 1/0116* (2013.01); *B60W 2556/45* (2020.02)

(58) Field of Classification Search
CPC ....... G08G 1/22; G08G 1/0116; B60W 40/06; B60W 2556/45
See application file for complete search history.

(56) References Cited

U.S. PATENT DOCUMENTS 8,417,860 B2 * 4/2013 Choi ...................... H04L 67/12
710/100
9,725,083 B2 * 8/2017 Dextreit ................. B60W 10/06
10,353,387 B2 * 7/2019 Stenneth .............. G05D 1/0297
(Continued)

FOREIGN PATENT DOCUMENTS

JP 2004094780 A 3/2004
JP 2013045233 A 3/2013
(Continued)

OTHER PUBLICATIONS

International Search Report for PCT Application No. PCT/JP2020/003613, dated Feb. 25, 2020.

*Primary Examiner* — Hussein Elchanti
(74) *Attorney, Agent, or Firm* — Sughrue Mion, PLLC

(57) ABSTRACT

A vehicle management device including request information reception means for receiving request information for platooning multiple vehicles; implementation feasibility assessment means for assessing an implementation feasibility of a platoon based on the request information; and implementation permission means for permitting implementation of the platoon based on a result of assessing of the implementation feasibility.

15 Claims, 6 Drawing Sheets

(56) References Cited

U.S. PATENT DOCUMENTS

| | | | | |
|---|---|---|---|---|
| 2002/0133285 | A1* | 9/2002 | Hirasago | B60K 35/00 |
| | | | | 701/96 |
| 2007/0030212 | A1* | 2/2007 | Shibata | G06T 5/50 |
| | | | | 345/9 |
| 2007/0115138 | A1* | 5/2007 | Arakawa | B60R 1/00 |
| | | | | 348/148 |
| 2008/0167774 | A1* | 7/2008 | Patel | G08G 1/20 |
| | | | | 701/1 |
| 2010/0114541 | A1* | 5/2010 | Johnson | G06N 3/006 |
| | | | | 703/2 |
| 2013/0080041 | A1* | 3/2013 | Kumabe | G08G 1/22 |
| | | | | 701/117 |
| 2013/0235169 | A1* | 9/2013 | Kato | G02B 30/34 |
| | | | | 348/53 |
| 2014/0236414 | A1* | 8/2014 | Droz | G08G 1/015 |
| | | | | 701/1 |
| 2015/0291160 | A1* | 10/2015 | Kim | B60W 30/16 |
| | | | | 345/633 |
| 2016/0170487 | A1* | 6/2016 | Saisho | B60K 35/00 |
| | | | | 345/156 |
| 2016/0240085 | A1* | 8/2016 | Otsuka | G06V 20/58 |
| 2017/0036601 | A1* | 2/2017 | Kimura | B60R 1/00 |
| 2017/0305365 | A1* | 10/2017 | Matsumoto | B60R 37/06 |
| 2018/0120861 | A1* | 5/2018 | Saxena | G05D 1/0291 |
| 2019/0044728 | A1* | 2/2019 | Karmoose | H04L 9/0643 |
| 2019/0349719 | A1* | 11/2019 | Pattan | H04L 67/55 |
| 2019/0378418 | A1* | 12/2019 | Menadue | H04W 4/46 |
| 2020/0186290 | A1* | 6/2020 | Zhang | H04L 1/0031 |
| 2020/0249699 | A1* | 8/2020 | Kim | G05D 1/0295 |
| 2022/0104200 | A1* | 3/2022 | Zang | H04W 72/02 |

FOREIGN PATENT DOCUMENTS

| | | |
|---|---|---|
| JP | 2016146013 A | 8/2016 |
| JP | 2017062691 A | 3/2017 |
| JP | 2018180643 A | 11/2018 |
| WO | 2018111177 A1 | 6/2018 |

* cited by examiner

VEHICLE MANAGEMENT DEVICE, VEHICLE MANAGEMENT METHOD, AND STORAGE MEDIUM HAVING PROGRAM STORED THEREIN

This application is a National Stage Entry of PCT/JP2020/003613 filed on Jan. 31, 2020, which claims priority from Japanese Patent Application 2019-018090 filed on Feb. 4, 2019, the contents of all of which are incorporated herein by reference, in their entirety.

TECHNICAL FIELD

The present invention relates to a vehicle management device, a vehicle management method, and a storage medium having a program stored therein.

BACKGROUND ART

In recent years, technologies for making vehicles travel by forming platoons have been considered. By making vehicles travel by forming platoons, effects such as improved fuel economy of the vehicles and increased transportable quantities can be expected. In roads on which multiple vehicles are platooned, there is a possibility that a vehicle not belonging to a platoon will have difficulty entering a traffic lane. For example, if a column of platooned vehicles traveling on the main lane of a road is long, then other vehicles entering the main lane from an entry lane cannot enter until the last vehicle in the platoon passes by, and thus must temporarily stop at the junction point between the entry lane and the main lane. In that case, if there are many vehicles entering the main lane from an entry lane, congestion will occur at the junction point between the main lane and the entry lane. Therefore, the lengths of the columns of platooned vehicles, the road intervals on which they travel and the like must be appropriately managed.

Patent Document 1 describes technology for enabling grouped travel in which multiple vehicles travel in a group. Additionally, Patent Document 1 describes that a travel management center receives and registers reservation requests including vehicles to participate in grouped travel, the origins and destinations of those vehicles, and desired times. The travel management center also proposes travel plans and monitors the grouped travel implementation conditions.

CITATION LIST

Patent Literature

[Patent Document 1]
Japanese Unexamined Patent Application, First Publication No. 2017-62691

SUMMARY OF THE INVENTION

Problems to be Solved by the Invention

When vehicles are platooned as mentioned above, the implementation of the vehicle platoon must be managed based on the conditions or the like on the roads on which the platoon is to be implemented.

Thus, an example of an objective of the present invention is to provide a vehicle management device, a vehicle management method, and a recording medium for storing a program, which solve the above-mentioned problem.

Means for Solving the Problems

According to a first aspect of the invention, a vehicle management device includes request information reception means for receiving request information for platooning multiple vehicles; implementation feasibility assessment means for assessing an implementation feasibility of a platoon based on the request information; and implementation permission means for permitting implementation of the platoon based on a result of assessing of the implementation feasibility.

According to a second aspect of the invention, a vehicle management method includes receiving request information for platooning multiple vehicles; assessing an implementation feasibility of a platoon based on the request information; and permitting implementation of the platoon based on a result of assessing of the implementation feasibility.

According to a third aspect of the invention, a program stored in a storage medium makes a computer in a vehicle management device execute processes. The processes includes receiving request information for platooning multiple vehicles; assessing an implementation feasibility of a platoon based on the request information; and permitting implementation of the platoon based on a result of assessing of the implementation feasibility.

Advantageous Effects of Invention

According to the present invention, platoons can be managed by appropriately assessing whether or not the platoons may be implemented based on the conditions of the roads on which the vehicles are to be platooned.

EXAMPLE EMBODIMENT

Hereinafter, the vehicle management device according to an embodiment of the present invention will be explained with reference to the drawings.

Figure 1:
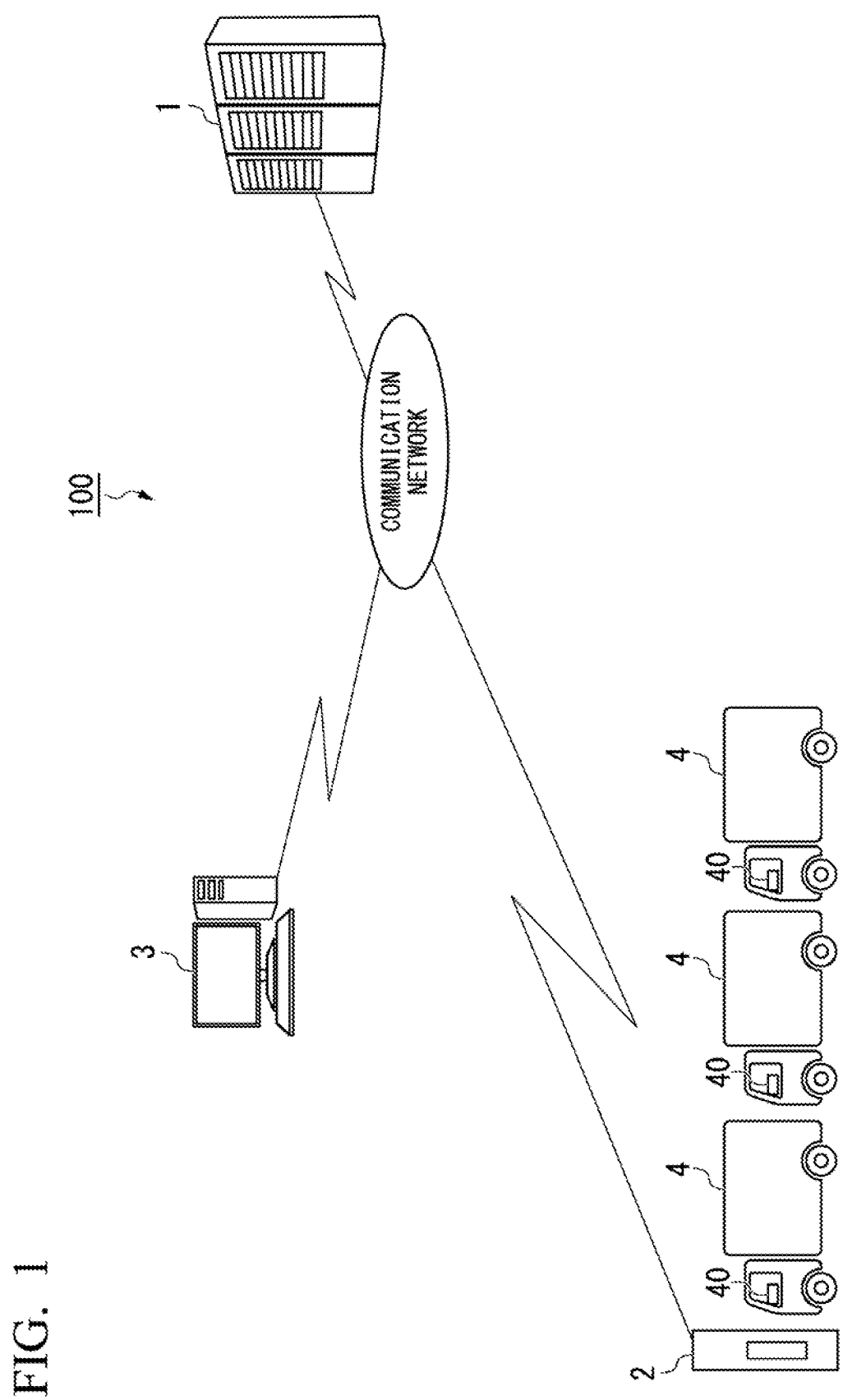
FIG. 1 is a diagram illustrating the configuration of a vehicle management system according to an embodiment of the present invention.

FIG. 1 is a diagram illustrating the configuration of a vehicle management system according to the same embodiment.

The vehicle management system 100 illustrated in FIG. 1, as one example, comprises a vehicle management device 1, a roadside machine 2, and a terminal 3.

The vehicle management device 1 communicatively connects with the roadside machine 2 and the terminal 3.

The roadside machine 2 is installed in the roadside or the like of a road that is to be traveled in a platoon. The roadside machine 2 has a passage detection function for detecting that a vehicle 4 has passed, and a communication function for communicating with an onboard device 40 mounted on the vehicle 4 and the vehicle management device 1. The roadside machine 2 transmits, to the vehicle management device 1, information received from the onboard device 40 based on the communicative connection with the onboard device 40. Additionally, the roadside machine 2 can transmit information received from the vehicle management device 1 to the onboard device 40.

In the present embodiment, the onboard device 40 has functions for implementing platoons. For example, in order to follow a vehicle 4 participating at a position immediately ahead of own vehicle in the platoon (a vehicle ahead), the onboard device 40 may be provided with a function for detecting the distance to and the position of the vehicle ahead, a function for controlling the transmission and reception of radar for performing said detection, and a function for controlling the speed and the advancement direction of the vehicle based on the detection results. Additionally, the onboard device 40 may have a function for performing processes for implementing platoons based on the information received from the vehicle management device 1. As the processes performed by the onboard device 40 for implementing platoons, known technology is used.

The terminal 3 is used by a requester who manages vehicles 4 that are to travel by forming a platoon and who requests platooning of the vehicles 4. The requester uses the terminal 3 to request implementation of a platoon in which multiple vehicles 4 form a platoon. The terminal 3 generates request information for implementing a platoon based on operations by the requester, and transmits the request information to the vehicle management device 1. As one example, the terminal 3 is a personal computer or a mobile terminal.

Figure 2:
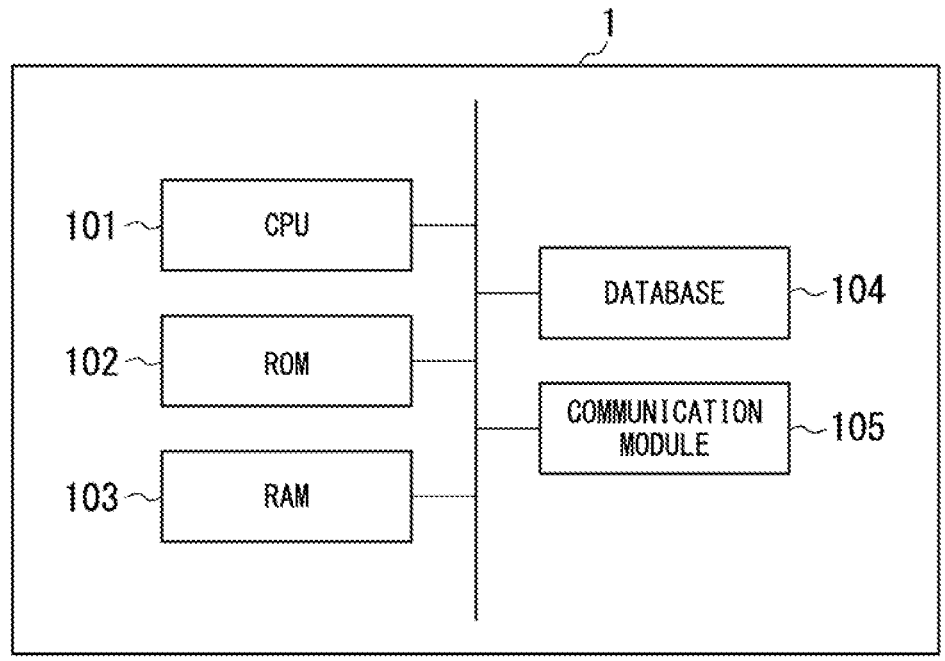
FIG. 2 is a hardware configuration diagram of a vehicle management device according to an embodiment of the present invention.

FIG. 2 is a hardware configuration diagram of the vehicle management device.

As illustrated in this diagram, the vehicle management device 1 is a computer provided with hardware such as a CPU (Central Processing Unit) 101, a ROM (Read-Only Memory) 102, a RAM (Random Access Memory) 103, a database 104, and a communication module 105.

Figure 3:
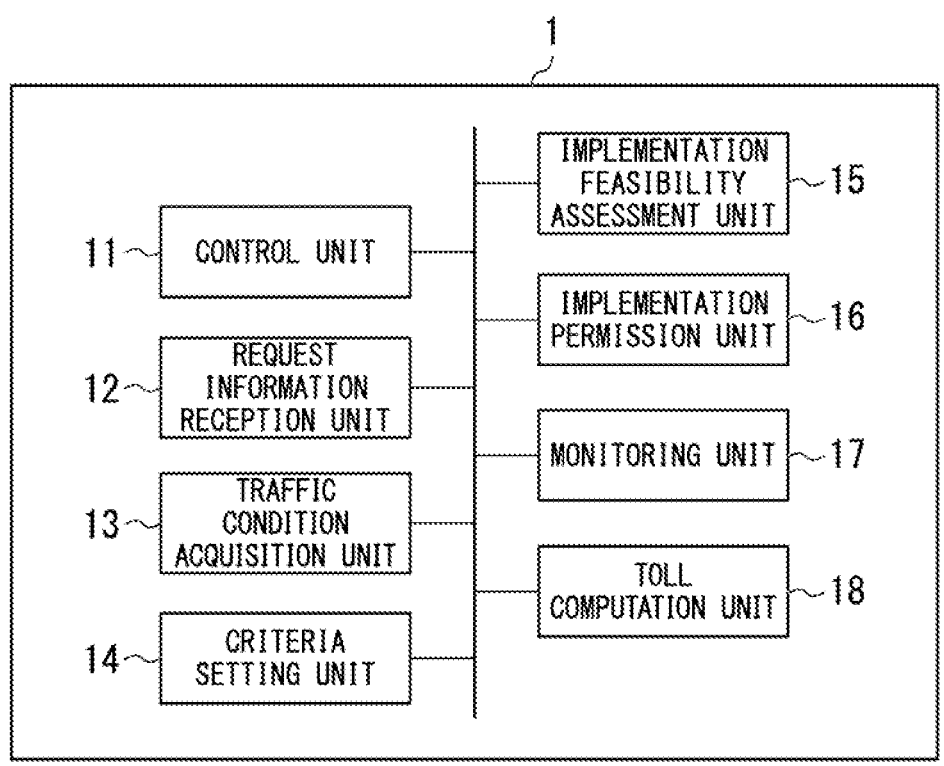
FIG. 3 is a functional block diagram of a vehicle management device according to an embodiment of the present invention.

FIG. 3 is a functional block diagram of the vehicle management device.

The vehicle management device 1 starts up when the power is turned on, and executes a pre-stored management program. As a result thereof, the vehicle management device 1 executes the functions of a control unit 11, a request information reception unit 12, a traffic condition acquisition unit 13, a criteria setting unit 14, an implementation feasibility assessment unit 15, an implementation permission unit 16, a monitoring unit 17, and a toll computation unit 18.

The control unit 11 controls the functional units in the vehicle management device 1.

The request information reception unit 12 receives request information for the platooning of multiple vehicles 4.

The traffic condition acquisition unit 13 acquires traffic condition information relating to the roads on which the platoon is to be implemented.

The criteria setting unit 14 sets criteria relating to the platoon based on the traffic condition information.

The implementation feasibility assessment unit 15 assesses the implementation feasibility of the platoon based on the request information.

The implementation permission unit 16 permits implementation of the platoon based on the implementation feasibility assessment results.

The monitoring unit 17 monitors whether or not the implementation conditions of the platoon of the vehicles 4 match those of a platoon mode included in the request information.

The toll computation unit 18 computes a discounted toll if the implementation conditions of the platoon of the vehicles 4 match those of the platoon mode included in the request information.

In a vehicle management system 100 as described above, the vehicle management device 1 receives request information for the platooning of multiple vehicles. Additionally, the vehicle management device 1 assesses the implementation feasibility of the platoon based on the request information. The vehicle management device 1 permits implementation of the platoon based on the assessment results regarding the implementation feasibility of the platoon.

When assessing the implementation feasibility of the platoon, the vehicle management device 1 acquires traffic condition information relating to request information for roads on which the platoon is to be implemented, and sets criteria relating to the platoon based on the acquired traffic condition information. Furthermore, the vehicle management device 1 assesses the implementation feasibility of the platoon based on the criteria that have been set.

As a result thereof, the vehicle management device 1 can manage the implementation of the vehicle platoon.

Figure 4:
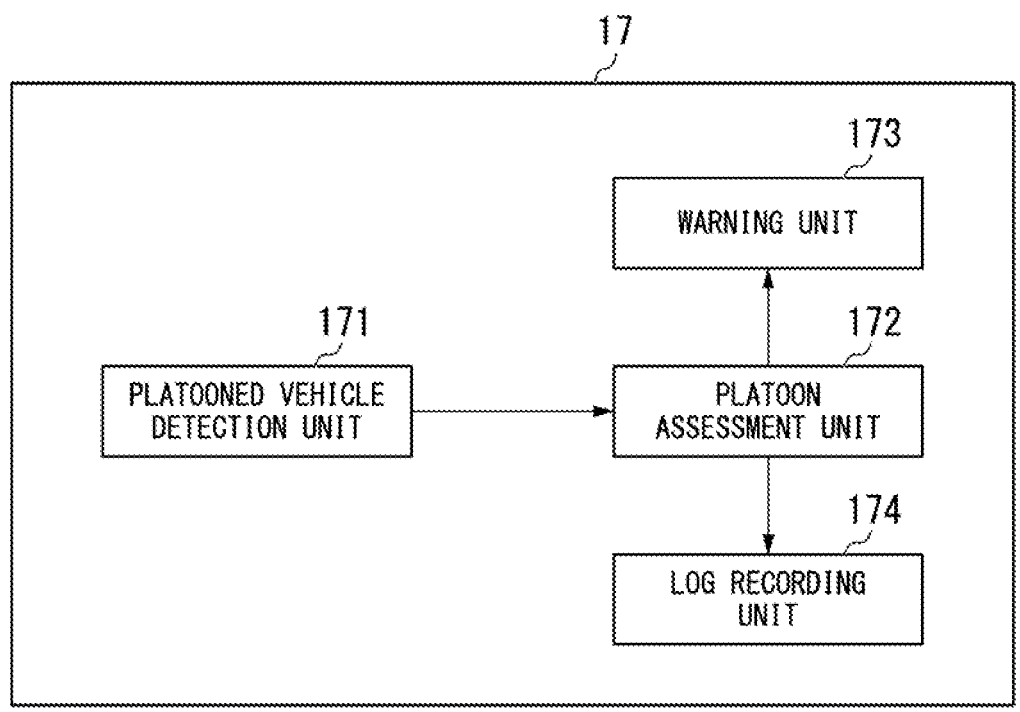
FIG. 4 is a functional block diagram of a monitoring unit according to an embodiment of the present invention.

FIG. 4 is a functional block diagram of a monitoring unit.

As illustrated in FIG. 4, the monitoring unit 17 further executes the functions of a platooned vehicle detection unit 171, a platoon assessment unit 172, a warning unit 173, and a log recording unit 174.

The platooned vehicle detection unit 171 detects vehicles 4 implementing a platoon.

The platoon assessment unit 172 assesses the implementation feasibility of a platoon indicated in request information.

The warning unit 173, when the implementation conditions of a platoon of vehicles 4 are assessed as not being those of implementation based on a platoon in accordance with the request information, transmits information that indicates a warning to the vehicles 4 forming the platoon, and the terminal 3 being used by the requester managing the vehicles 4.

The log recording unit 174 records the assessment results of the platoon assessment unit 172.

Figure 5:
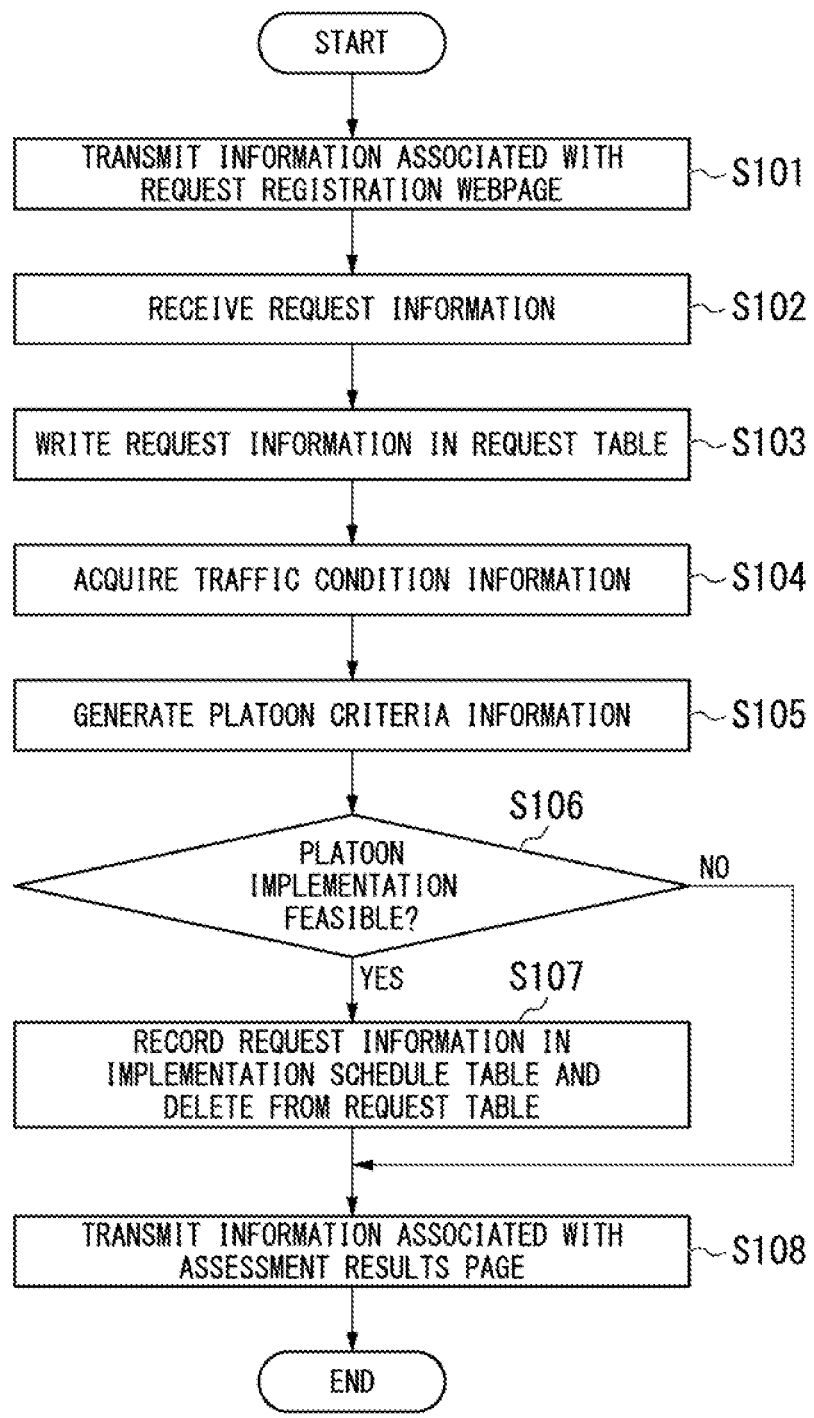
FIG. 5 is a first diagram illustrating the processing flow in a vehicle management device according to an embodiment of the present invention.

FIG. 5 is a first diagram illustrating the processing flow in the vehicle management device.

Next, the processing by the vehicle management device 1 will be explained.

First, when the requester is to make multiple vehicles 4 managed by the requester travel in a platoon, the requester uses the terminal 3 to request platooning. The platoon may include vehicles 4 managed by other requesters. When making the request, the requester makes the terminal 3 access the vehicle management device 1. The request information reception unit 12 in the vehicle management device 1 detects the access by the terminal 3 and transmits information associated with a request registration webpage to the terminal 3 (step S101). In other words, the request information reception unit 12 has the function of a web server, and uses said function to transmit information associated with the request registration webpage to the terminal 3.

The request registration webpage is provided with input fields for information such as a requester number, onboard device IDs for identifying the vehicles that are to form the platoon, numbers printed on the license plates, the platooning interval, the platoon implementation time, the number of vehicles to be platooned, and the order of each vehicle 4 in the platoon when the platoon is formed.

The terminal 3 receives the information associated with the request registration webpage. The terminal 3 outputs the request registration webpage to a monitor. The requester uses input devices such as a mouse and a keyboard to input information into the input fields for information such as the requester number, onboard device IDs for identifying the vehicles that are to form the platoon, numbers printed on the license plates, the platooning interval, the platoon implementation time, the number of vehicles to be platooned, and the order of each vehicle 4 in the platoon when the platoon is formed. Additionally, the requester presses a register button provided on the request registration webpage.

Then, the terminal 3 generates platoon request information including the various types of information entered in the input fields. The terminal 3 transmits the request information to the vehicle management device 1. The information on the platooning interval included in the request information may include information such as road IDs for specifying roads, and platooning start coordinates and platooning end coordinates indicating the platooning interval on those roads.

The vehicle management device 1 receives the request information (step S102). The request information reception unit 12 in the vehicle management device 1 writes the request information in a request table stored in the database 104 (step S103). Additionally, the request information reception unit 12 instructs the implementation feasibility assessment unit 15 to start assessing the implementation feasibility of a platoon based on the information included in the request information.

Then, the implementation feasibility assessment unit 15, based on the platooning interval included in the request information, detects the road IDs included in the platooning interval, and platooning start coordinates and platooning end coordinates for the platoon on those roads. The implementation feasibility assessment unit 15 outputs the detected information and the platoon implementation time to the traffic condition acquisition unit 13. Additionally, the implementation feasibility assessment unit 15 outputs information including at least the platooning interval and the platoon implementation time included in the request information to the criteria setting unit 14, and instructs the criteria setting unit 14 to generate criteria information indicating implementation feasibility assessment criteria.

The traffic condition acquisition unit 13 acquires the road IDs of the roads included in the platooning interval, the platooning start coordinates and platooning end coordinates for the platoon on those roads, and the platoon implementation time. The traffic condition acquisition unit 13 generates a traffic condition report demand including the road IDs, the platooning start coordinates and platooning end coordinates for the platoon on those roads, and the platoon implementation time. The traffic condition acquisition unit 13 transmits the traffic condition report demand to a traffic condition reporting server communicatively connected to the vehicle management device 1. The traffic condition reporting server is not illustrated in FIG. 1, but is located outside the vehicle management system 100 and is communicatively connected to the vehicle management device 1.

The traffic condition reporting server acquires the road IDs, the platooning start coordinates and platooning end coordinates for the platoon on those roads, and the platoon implementation time, which are included in the traffic condition report demand. The traffic condition reporting server acquires traffic condition information recorded in a database or the like in association with the road IDs, the platooning start coordinates and platooning end coordinates for the platoon on those roads, and the platoon implementation time.

The traffic condition information may include, for example, a predicted congestion level (such as the number of vehicles traveling per unit time), and whether or not a traffic jam is predicted. The traffic condition information may also include information such as the states of road surfaces, and the shapes of roads (whether forked or not, whether there are entry lanes or not). The traffic condition information may also include weather information (information indicating fair weather, cloudiness, rain, snow, typhoons and the like) for a geographic area and a time identified by the road IDs, the platooning start coordinates and platooning end coordinates for the platoon on those roads, and the platoon implementation time.

This information regarding the congestion level, whether or not there is a traffic jam, the shapes of the roads, and the weather may be information that the traffic condition reporting server has obtained from another device in advance, or may be information computed on the basis of information obtained by various sensors in advance, and registered in the that device. The traffic condition information may include a number of vehicles that can be platooned (platoonable number), which is preset for the roads specified by the road IDs, and the platooning start coordinates and platooning end coordinates.

The traffic condition reporting server transmits the acquired traffic condition information to the vehicle management device 1. The vehicle management device 1 receives the traffic condition information. The traffic condition acquisition unit 13 in the vehicle management device 1 acquires the traffic condition information (step S104).

The functions in the traffic condition reporting server may be provided in the vehicle management device 1. In other words, the vehicle management device 1 may acquire and store the traffic condition information in advance, or may compute the traffic condition information. The traffic condition acquisition unit 13 outputs the traffic condition information, the platooning interval, and the platoon implementation time to the criteria setting unit 14.

The criteria setting unit 14 acquires the information such as the congestion level, whether or not there is a traffic jam, the shapes of the roads, the weather information, and the platoonable number included in the traffic condition information. The criteria setting unit 14 uses at least one of the congestion level, whether or not there is a traffic jam, the shapes of the roads, the weather information, and the platoonable number to generate platoon criteria information (step S105). The criteria setting unit 14 may generate the platoon criteria information by using at least one item of information chosen from the congestion level, whether or not there is a traffic jam, the shapes of the roads, the weather information, and the platoonable number, and at least one item of information chosen from the platooning interval and the platoon implementation time.

The platoon criteria information indicates a value indicating whether or not a platoon can be permitted, the number of vehicles in a platoon for which platooning can be permitted (platoonable number), the length of a platoon for which platooning can be permitted, or the like.

More specifically, as one example, the criteria setting unit 14 inputs, to a criteria information generation model generated by machine learning or the like, information to be used for generating criteria information chosen from the congestion level, whether or not there is a traffic jam, the shapes of the roads, the weather information, the platooning interval, and the platoon implementation time, and outputs criteria information. Additionally, the criteria setting unit 14 may specify criteria information in accordance with information to be used for generating the criteria information based on a data table indicating correspondence relationships between the criteria information and the information to be used for generating the criteria information chosen from the congestion level, whether or not there is a traffic jam, the shapes of the roads, the weather information, the platooning interval, and the platoon implementation time. The implementation feasibility assessment unit 15 acquires the criteria information from the criteria setting unit 14.

The processing in the above-mentioned traffic condition acquisition unit 13 and the criteria setting unit 14 may be performed in advance. For example, the traffic condition acquisition unit 13 sequentially acquires traffic condition information predicted separately for prescribed intervals on roads throughout the country and for future time slots. Furthermore, the criteria setting unit 14 specifies the criteria information for various types of predicted traffic condition information for each of the prescribed intervals on roads throughout the country and for each of the future time slots acquired by the traffic condition acquisition unit 13. This criteria information is recorded in the criteria information database in advance for each of the prescribed intervals on roads throughout the country and for each of the future time slots.

Furthermore, the implementation feasibility assessment unit 15 may start the process of assessing the platoon implementation feasibility by reading criteria information recorded in the criteria information database in association with the platooning interval and the platoon implementation time, which are included in the request information. The criteria setting unit 14 outputs the criteria information to the implementation feasibility assessment unit 15.

The implementation feasibility assessment unit 15 acquires the criteria information from the criteria setting unit 14. The implementation feasibility assessment unit 15 compares the criteria information with a category to be compared included in the platoon request information received in step S102 to assess whether or not the platoon can be implemented (step S106).

For example, assume that the criteria information includes a value indicating whether or not a platoon can be permitted, and the number of vehicles in a platoon for which platooning can be permitted. Additionally, assume that the comparison target category included in the request information is the number of vehicles in the platoon. In this case, if a value indicating whether or not the platoon included in the criteria information can be permitted indicates that the platoon can be permitted, and the number of vehicles in the platoon, which is the category to be compared included in the request information, is equal to or greater than the number of vehicles forming a platoon for which platooning can be permitted, which is included in the criteria information, then an assessment is made that the platoon can be implemented as requested. Upon making an assessment that the platoon specified by the request information can be implemented, the implementation feasibility assessment unit 15 instructs the implementation permission unit 16 to perform a process.

If an assessment is made that the platoon specified by the request information can be implemented, then the implementation permission unit 16 records the request information recorded in the request table in an implementation schedule table, and deletes the request information from the request table (step S107). As a result thereof, the implementation permission unit 16 can permit the implementation of the platoon. The implementation permission unit 16 instructs the request information reception unit 12 to transmit, to the terminal 3, an assessment result indicating whether the platoon specified by the request information can be implemented or cannot be implemented. The request information reception unit 12 transmits, to the terminal 3, information associated with an assessment results page indicating the assessment results (step S108).

The terminal 3 displays the assessment results page on a monitor. If the assessment results provided on the assessment results page indicate that the platoon cannot be implemented, then the requester who instructed the request information to be transmitted can modify the request details and press a re-request button. Then, the terminal 3 transmits a request registration webpage retransmission demand to the vehicle management device 1. The request information reception unit 12 in the vehicle management device 1 retransmits the request registration webpage to the terminal 3. Subsequently, the requester may, as described above, use the terminal 3 to transmit, to the vehicle management device 1, the request information with the details changed.

Due to the above processes, the vehicle management device 1 can assess the implementation feasibility of the platoon demanded by the requester based on the request information received from the terminal 3. The vehicle management device 1 performs this assessment of the implementation feasibility based on the traffic conditions for the platooning interval and the time at which the platoon is to be implemented, thus allowing platoons to be managed by appropriately assessing the implementation feasibility of the vehicle platoon. In other words, the vehicle management device 1 can restrict platoon implementation in accordance with traffic conditions, thereby contributing to the avoidance of accidents or worsened congestion.

Figure 6:
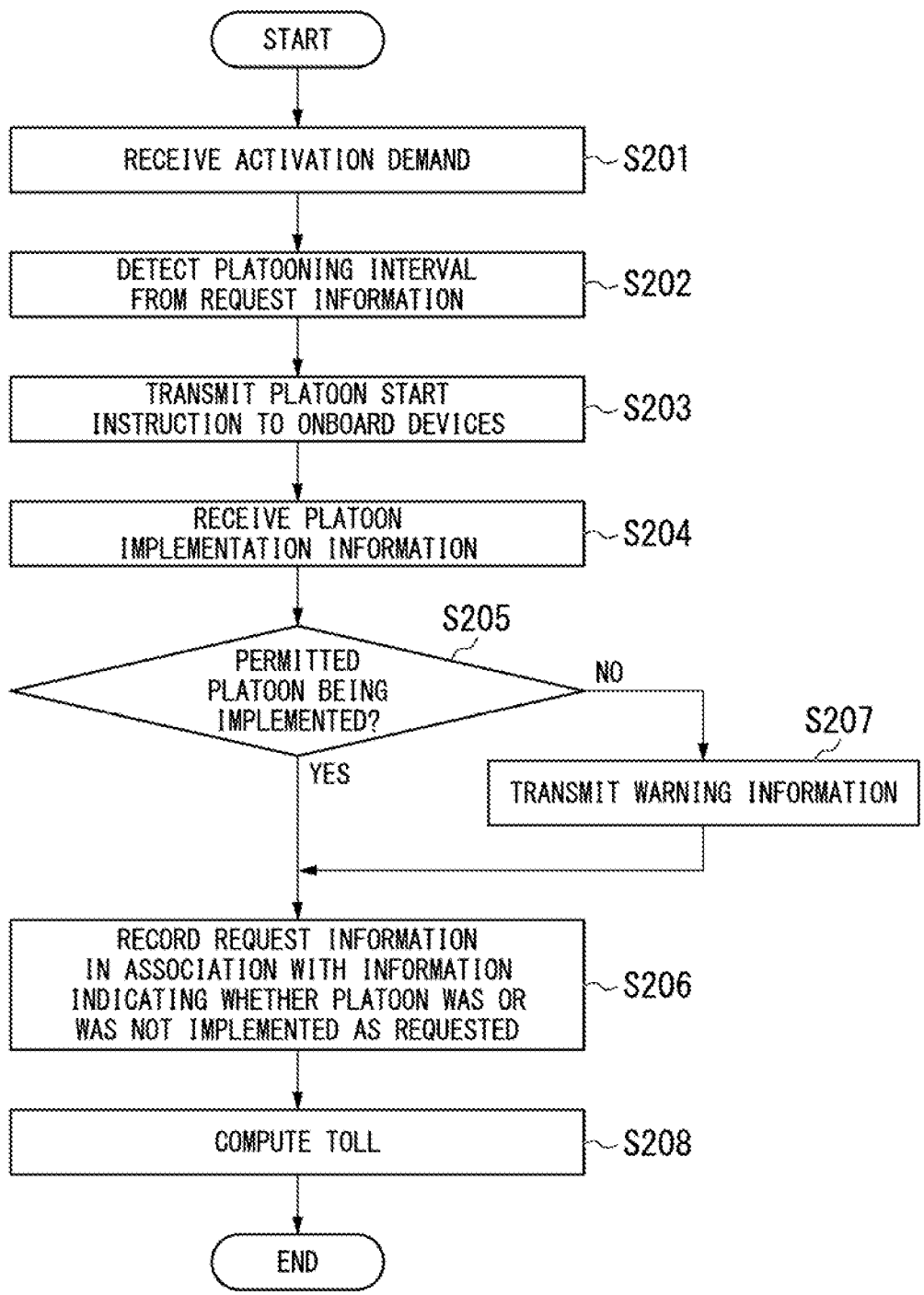
FIG. 6 is a second diagram illustrating the processing flow in a vehicle management device according to an embodiment of the present invention.

FIG. 6 is a second diagram illustrating the processing flow in the vehicle management device.

Next, a platoon monitoring process by the vehicle management device 1 will be explained.

As one example, the present embodiment will be explained using an example of a case in which multiple vehicles 4 form a platoon in a prescribed dedicated area provided in an expressway service area or the like. For example, each of the multiple vehicles 4 enters the expressway from a different entrance, and arrives at the dedicated area in a prescribed service area.

In the dedicated area, the drivers of the vehicles 4 drive the vehicles 4 with which they are charged and move the vehicles 4 to positions in the platoon (positions in a prescribed order in the platoon) for implementing the platoon specified by the platoon request information. The drivers operate the onboard devices 40 provided in the vehicles 4 and instruct them to start processes for implementing the platoon. At this time, the onboard devices 40 initiate platoon starting control under control by the vehicle management device 1. In this case, the onboard devices 40 transmit, to the vehicle management device 1, a platoon control activation demand including a requester number, an onboard device ID, the numbers printed on the license plate of the vehicle 4, a platooning interval, a platoon implementation time, number of platooned vehicles, and the order in the platoon, for specifying the platoon.

The vehicle management device 1 receives the activation demand (step S201). The implementation permission unit 16 in the vehicle management device 1, upon acquiring the activation demand, specifies platoon request information from the implementation schedule table stored in the database 104 based on the information included in the activation demand.

The implementation permission unit 16 detects the platooning interval based on the platoon request information (step S202). The implementation permission unit 16 acquires traffic lane map information and line marker information for the detected platooning interval from the database 104. The traffic lane map information includes, for example, the positions of articles installed on the road, such as road signs, the positions of road center lines, and information based on the designs of the roads, such as the number of traffic lanes and the curvature of curves, in accordance with the positions. The line marker information is, for example, information including position information and IDs of multiple markers embedded, with a prescribed spacing, in the road in the platooning interval.

Furthermore, the implementation permission unit 16 transmits a platoon start instruction, including the traffic lane map information and the line marker information, to the onboard devices 40 that transmitted the activation demand (step S203). While the platoon is being implemented, the onboard vehicles 40 may use the traffic lane map information and the line marker information to detect the platooning interval. This process is one mode of a process by which, in the case that the platoon implementation is assessed to be feasible as a result of the implementation feasibility assessment, the implementation permission unit 16 transmits, to the vehicles 4, information for activating the platoon control functions provided in the vehicles. The onboard devices 40 receive the platoon start instruction and start controlling the platoon based on that instruction.

Furthermore, a driver enters the vehicle 4 positioned at the head of the platoon and drives the vehicle manually or automatically, and the trailing vehicles 4 travel by maintaining a certain distance from the vehicle positioned immediately ahead in said platoon. Additionally, when a roadside machine 2 is passed while traveling in the platoon, the onboard devices 40 receive signals generated from the roadside machine 2. The onboard devices 40 communicatively connect with the roadside machine 2 or the vehicle management device 1 on the basis of the reception of the signals generated from the roadside machine 2.

The onboard devices 40 may receive the request information from the vehicle management device 1 beforehand or by an operation by a driver after the platoon has been formed. The implementation permission unit 16 in the vehicle management device 1 receives request information transmission demands from the onboard devices 40 before transmitting the request information to the onboard devices 40. These request information transmission demands include information such as the requester number, the onboard device ID, the license plate number of the vehicle 4, the platooning interval, the platoon implementation time, the number of platooned vehicles, and the order in the platoon, for specifying the platoon.

The implementation permission unit 16 determines whether or not request information including this information is included in the implementation schedule table stored in the database 104. If request information holding a set of information included in the request information transmission demand is included in the implementation schedule table, then the implementation permission unit 16 transmits the request information to the onboard devices 40. As a result thereof, the onboard devices 40 can store the request information.

The trailing vehicles 4 other than the vehicle 4 at the head of the platoon may or may not be manned by drivers. However, if the trailing vehicles 4 other than the lead vehicle 4 are not manned by drivers, then other drivers that can take over the driving for the unmanned vehicles in the platoon should be waiting in a dedicated area at which the platoon is to be disbanded, indicating the endpoint of the interval over which the platoon is to be implemented. The vehicles 4 constituting a platoon may exit an expressway from different exits and travel to different destinations.

Suppose that a platoon has finished being formed and is to start platooning. If an onboard device 40 then receives a signal from a roadside machine 2 installed on the roadside of the expressway, the onboard device 40 communicatively connects with the roadside machine 2. The onboard device 40 transmits platoon implementation information, including the onboard device ID, to the roadside machine 2. As each vehicle 4 in the platoon passes by the roadside machine 2, the roadside machine 2 may acquire platoon implementation information sequentially from the onboard devices 40 in the vehicles 4.

The platoon implementation information may include the onboard device IDs of the onboard devices 40 in vehicles 4 that are traveling ahead in the platoon, received by an onboard device 40 through intervehicle communication from the other onboard devices 40 installed in the vehicles 4 traveling ahead. The platoon implementation information may include time stamp information indicating the time at which said information was transmitted by the onboard device 40, and time stamp information indicating the time at which the roadside machine 2 received the onboard device ID. The roadside machine 2 transmits the platoon implementation information to the vehicle management device 1. The platoon implementation information is information for notifying the vehicle management device 1 whether the vehicles 4 on which the onboard devices 40 are installed are traveling in the platoon.

The vehicle management device 1 receives the platoon implementation information from the roadside machine 2 (step S204). The monitoring unit 17 in the vehicle management device 1 sequentially acquires platoon implementation information transmitted from the onboard devices 40 of the vehicles traveling in the platoon. The platooned vehicle detection unit 171 outputs vehicle IDs and time stamp information included in each set of platoon implementation information to the platoon detection unit 171.

The platoon assessment unit 172, on the basis of a vehicle ID, acquires request information including said vehicle ID from an implementation schedule table included among the implementation schedule tables in the database 104. The platoon assessment unit 172 determines whether or not the onboard device IDs included in the acquired request information match the onboard device IDs included in each of the multiple sets of platoon implementation information that have been acquired. Additionally, the platoon assessment unit 172 determines whether or not platoon implementation information including each of the multiple onboard device IDs specified by the request information were able to be received by a roadside machine 2 within a prescribed time period that is expected to be required for the platoon to pass by the roadside machine 2.

Based on these determinations, the platoon assessment unit 172 assesses whether or not the platoon permitted in accordance with the request information is being implemented (step S205).

The platoon assessment unit 172 assesses that a platoon is being implemented as permitted in accordance with the request information if, in a comparison between the platoon implementation information and the request information, the onboard device IDs and the numbers thereof contained in each set of information match, and each set of platoon implementation information was able to be received by the roadside machine 2 within a prescribed time period.

The platoon assessment unit 172 may assess that a platoon is being implemented even if not all of the onboard device IDs included in the acquired platoon implementation information match with the onboard device IDs included in each of the multiple sets of platoon implementation information that have been acquired.

Additionally, the platoon assessment unit 172 assesses the order in the platoon based on the onboard device IDs of the onboard vehicles 40 in the vehicles 4 traveling ahead, which are included in the platoon implementation information. Furthermore, the platoon assessment unit 172 may assess whether or not the platoon is formed in the order indicated in the request information, and if the platoon is formed in that order, it may assess that the platoon is being implemented as permitted in accordance with the request information.

The platoon assessment unit 172 similarly assesses whether or not the platoon is being implemented as permitted in accordance with the request information based on the platoon implementation information acquired from all of the roadside machines 2 in the platooning interval included in the request information.

Upon making an assessment that the platoon is being implemented as permitted in accordance with the request information based on the platoon implementation information acquired from all of the roadside machines 2 in the platooning interval, the platoon assessment unit 172 performs the following process. Namely, the platoon assessment unit 172 outputs, to the log recording unit 174, the request information and information indicating that the platoon was implemented as requested.

Upon making an assessment that the platoon is not being implemented as permitted in accordance with the request information based on the platoon implementation information acquired from one roadside machine 2 among the platoon implementation information acquired from all of the roadside machines 2 in the platooning interval, the platoon assessment unit 172 performs the following process. Namely, the platoon assessment unit 172 outputs, to the log recording unit 174, the request information and information indicating that the platoon was not implemented as requested.

The log recording unit 174 writes the request information, in association with the information indicating that the platoon was implemented or was not implemented as requested, into a log recording table in the database 104 (step S206). As a result thereof, it can be recorded whether or not a platoon included in request information has been implemented.

The platoon assessment unit 172 outputs, to the warning unit 173, request information specifying a platoon that has been assessed as not having been implemented as requested. If a platoon has been assessed as not having been implemented as requested, then the warning unit 173 transmits, to the terminal 3 that transmitted the request information of that platoon, information for warning that the platoon was not implemented (step S207). The terminal 3 outputs the warning information to a monitor or the like. As a result thereof, the requester can be notified that the platoon was not implemented as requested.

Additionally, based on the request information specifying the platoon that was not implemented as requested, the warning unit 173 detects the onboard device ID of the vehicle 4 at the head of that platoon. The warning unit 173 may transmit warning information to the onboard device 40 indicated by the detected onboard device ID. As a result thereof, the drivers of the vehicles 4 constituting the platoon can be notified that the platoon is not being implemented as requested.

The vehicle management device 1 and the onboard devices 40 may be connected via a public communication network such as the internet or cellular telephone lines, or the vehicle management device 1 may transmit the information directly to the onboard devices 40.

The platoon assessment unit 172 may assess whether or not the order of the platoon is as requested by receiving order assessment information from a roadside machine 2 in order to detect the order of the platoon.

For example, the roadside machine 2 transmits a prescribed order detection signal to the onboard device 40 that was able to be communicatively connected first among the onboard devices 40 in vehicles constituting the platoon. The onboard device 40 inserts an onboard device ID for identifying that device in the order detection signal, and transmits the signal, by intervehicle communication, to the onboard device 40 in the vehicle 4 traveling immediately behind. The onboard device 40 in the vehicle 4 behind similarly inserts the onboard device ID for identifying that device into a storage area next to the onboard device IDs that are already written in the order detection signal. The onboard devices 40 in the following vehicles 4 perform similar processes.

Then, the onboard device 40 in the last vehicle 4 among the vehicles 4 constituting the platoon, after similarly inserting the onboard device ID of that device in the order detection signal, transmits the order detection signal to the roadside machine 2. The roadside machine 2 acquires onboard device IDs from the received order detection signal in the order in which they were inserted, and generates order assessment information holding the onboard device IDs without changing the order thereof. The roadside machine 2 transmits the order assessment information to the vehicle management device 1.

The vehicle management device 1 receives the order assessment information. Furthermore, the platoon assessment unit 172 in the vehicle management device 1 assesses that the platoon is implemented as requested if the onboard device IDs and the order of insertion thereof are the onboard device IDs and their ordering as contained in the request information.

The toll computation unit 18 acquires request information associated with information indicating that a platoon has been implemented as requested, which is written in the log recording table. The toll computation unit 18 computes a toll based on the platoon having been implemented as requested (step S208). Said toll may be a value that is discounted in comparison to a normal toll. The toll computation unit 18 may generate and transmit, to the terminal 3, billing information in accordance with the computed toll. The requester makes payments based on the computed toll.

According to the above-mentioned process, the vehicle management device 1 can confirm whether or not a platoon is being implemented as requested. Additionally, the vehicle management device 1 can compute a discounted toll based on implementation of the platoon.

Figure 7:
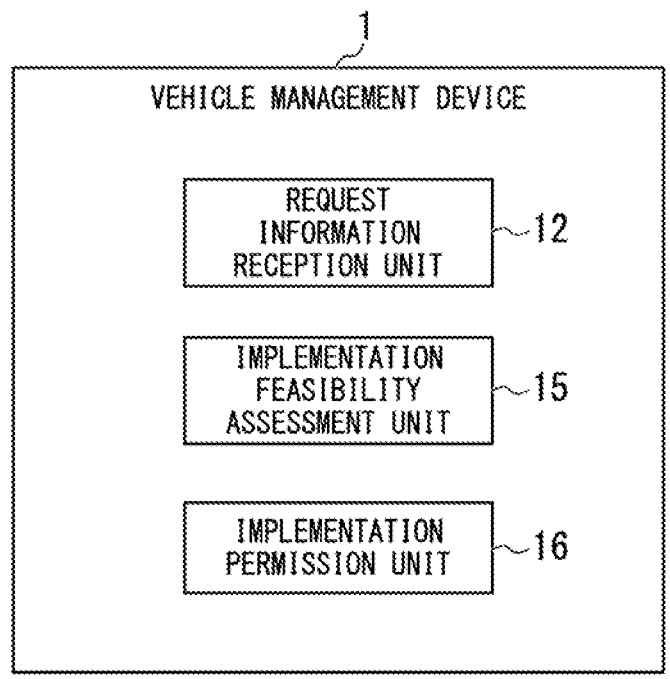
FIG. 7 is a diagram illustrating the minimum configuration of a vehicle management device according to an embodiment of the present invention.

FIG. 7 is a diagram illustrating the minimum configuration of the vehicle management device.

Figure 8:
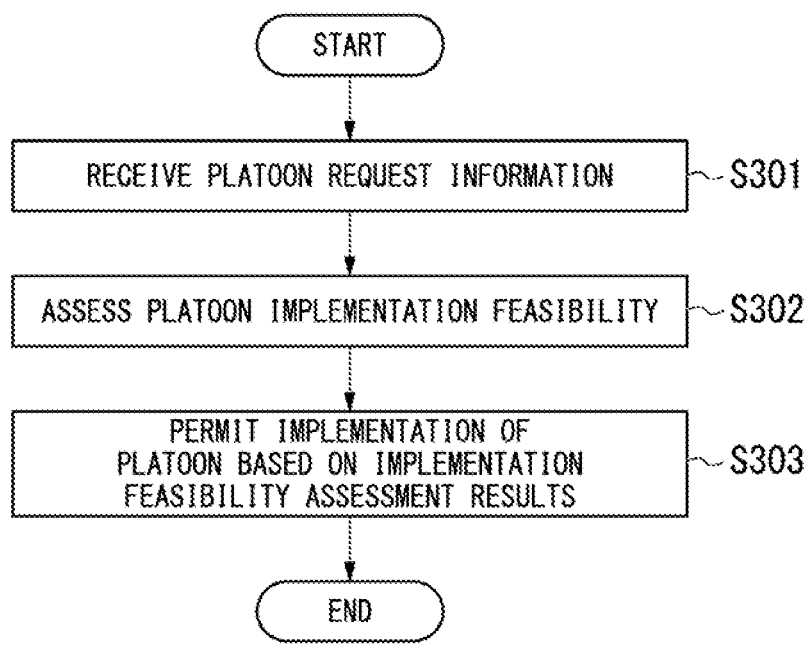
FIG. 8 is a diagram illustrating a flow chart corresponding to the minimum configuration of a vehicle management device according to an embodiment of the present invention.

FIG. 8 is a diagram illustrating a flow chart corresponding to the minimum configuration of the vehicle management device.

The vehicle management device 1 executes the functions of at least a request information reception unit (request information reception means) 12, an implementation feasibility assessment unit (implementation feasibility assessment means) 15, and an implementation permission unit (implementation permission means) 16.

Furthermore, the vehicle management device 1 receives request information for platooning multiple vehicles (step S301). Additionally, the vehicle management device 1 assesses the implementation feasibility of a platoon based on the request information (step S302). Furthermore, the vehicle management device 1 permits a platoon to be implemented based on a result of assessing of the implementation feasibility (step S303).

Each of the above-mentioned devices has a computer system contained therein. Furthermore, the steps in the above-mentioned process are stored in a computer-readable recording medium in the form of a program, and the above-mentioned process is performed by a computer reading out and executing this program. In this case, the computer-readable recording medium refers to a magnetic disc, a magneto-optic disc, a CD-ROM, a DVD-ROM, a semiconductor memory device, or the like. Additionally, this computer program may be transmitted to a computer by means of a communication line and the computer that has received this transmission may execute said program.

Additionally, the above-mentioned program may be for realizing a portion of the aforementioned functions.

Furthermore, the program may be in the form of a so-called difference file (difference program) that can realize the aforementioned functions by being combined with a program that is already recorded in a computer system.

The present application claims the benefit of priority based on Japanese Patent Application No. 2019-018090, filed Feb. 4, 2019, the entire disclosure of which is incorporated herein by reference.

INDUSTRIAL APPLICABILITY

According to the present invention, platoons can be managed by appropriately assessing whether or not the platoons may be implemented based on the conditions of the roads on which the vehicles are to be platooned.

REFERENCE SIGNS LIST

1 Vehicle management device
2 Roadside machine
3 Terminal
4 Vehicle
11 Control unit
12 Request information reception unit
13 Traffic condition acquisition unit
14 Criteria setting unit
15 Implementation feasibility assessment unit
16 Implementation permission unit
17 Monitoring unit
18 Toll computation unit
40 Onboard device

What is claimed is:

1. A vehicle management device comprising:
at least one memory configured to store instructions; and
at least one processor configured to execute the instructions to;
receive request information for platooning multiple vehicles;
acquire traffic condition information, associated with the request information, regarding a road on which a platoon is to be implemented;
set criteria relating to a number of vehicles in the platoon based on the acquired traffic condition information;
assess an implementation feasibility of the platoon based on the request information and the number of vehicles included in the criteria that are set;
permit implementation of the platoon based on a result of assessing of the implementation feasibility; and
transmit, in response to the activation request from the onboard device provided in a vehicle of the multiple vehicles if the platoon is assessed as being feasible to implement, a start instruction for the platoon to an onboard device that transmitted an activation request.

2. The vehicle management device according to claim 1, wherein the at least one processor is configured to execute the instructions to:
if the platoon is assessed as being feasible to implement as the result of the assessing of the implementation feasibility, transmit, to the vehicle, information that is required when implementing the platoon.

3. The vehicle management device according to claim 2, wherein the at least one processor is configured to execute the instructions to:
if the platoon is assessed as being feasible to implement as the result of the assessing of the implementation feasibility, transmit, to the vehicle, information for activating platoon control function provided in the vehicle.

4. The vehicle management device according to claim 1, wherein the at least one processor is configured to execute the instructions to:
acquire the traffic condition information according to a platooning interval and a time at which the platoon is to be implemented; and
set the criteria relating to the number of vehicles in the platoon for the platooning interval and the time at which the platoon is to be implemented, based on the acquired traffic condition information.

5. The vehicle management device according to claim 4, wherein the at least one processor is configured to execute the instructions to:
acquire the criteria relating to the number of vehicles in the platoon by inputting the acquired traffic condition information to a criterion model generated by machine learning; and
set the acquired criteria relating to the number of vehicles in the platoon.

6. A vehicle management method comprising:
receiving request information for platooning multiple vehicles;
acquiring traffic condition information, associated with the request information, regarding a road on which a platoon is to be implemented;

setting criteria relating to a number of vehicles in the platoon based on the acquired traffic condition information;

assessing an implementation feasibility of the platoon based on the request information and the number of vehicles included in the criteria that are set;

permitting implementation of the platoon based on a result of assessing of the implementation feasibility; and transmitting, in response to the activation request from the onboard device provided in a vehicle of the multiple vehicles if the platoon is assessed as being feasible to implement, a start instruction for the platoon to an onboard device that transmitted an activation request.

7. The vehicle management method according to claim 6, further comprising if the platoon is assessed as being feasible to implement as the result of the assessing of the implementation feasibility, transmitting, to the vehicle, information that is required when implementing the platoon.

8. The vehicle management method according to claim 7, wherein the transmitting includes transmitting, to the vehicle, information for activating platoon control function provided in the vehicle, if the platoon is assessed as being feasible to implement.

9. The vehicle management method according to claim 6, wherein the acquiring includes acquiring the traffic condition information according to a platooning interval and a time at which the platoon is to be implemented, and the setting includes setting the criteria relating to the number of vehicles in the platoon for the platooning interval and the time at which the platoon is to be implemented, based on the acquired traffic condition information.

10. The vehicle management method according to claim 9, wherein the acquiring includes acquiring the criteria relating to the number of vehicles in the platoon by inputting the acquired traffic condition information to a criterion model generated by machine learning, and the setting includes setting the acquired criteria relating to the number of vehicles in the platoon.

11. A non-transitory computer-readable storage medium having, stored therein, a program for making a computer in a vehicle management device execute processes, the processes comprising:

receiving request information for platooning multiple vehicles;

acquiring traffic condition information, associated with the request information, regarding a road on which a platoon is to be implemented;

setting criteria relating to a number of vehicles in the platoon based on the acquired traffic condition information;

assessing an implementation feasibility of the platoon based on the request information and the number of vehicles included in the criteria that are set;

permitting implementation of the platoon based on a result of assessing of the implementation feasibility; and transmitting, in response to the activation request from the onboard device provided in a vehicle of the multiple vehicles if the platoon is assessed as being feasible to implement, a start instruction for the platoon to an onboard device that transmitted an activation request.

12. The non-transitory computer-readable storage medium according to claim 11, further comprising if the platoon is assessed as being feasible to implement as the result of the assessing of the implementation feasibility, transmitting, to the vehicle, information that is required when implementing the platoon.

13. The non-transitory computer-readable storage medium according to claim 12, wherein the transmitting includes transmitting, to the vehicle, information for activating platoon control function provided in the vehicle, if the platoon is assessed as being feasible to implement.

14. The non-transitory computer-readable storage medium according to claim 11, wherein the acquiring includes acquiring the traffic condition information according to a platooning interval and a time at which the platoon is to be implemented, and the setting includes setting the criteria relating to the number of vehicles in the platoon for the platooning interval and the time at which the platoon is to be implemented, based on the acquired traffic condition information.

15. The non-transitory computer-readable storage medium according to claim 14, wherein the acquiring includes acquiring the criteria relating to the number of vehicles in the platoon by inputting the acquired traffic condition information to a criterion model generated by machine learning, and the setting includes setting the acquired criteria relating to the number of vehicles in the platoon.

* * * * *